Feb. 3, 1959 S. SANTAMARIA ET AL 2,872,645

MECHANICAL APPARATUS

Filed Aug. 23, 1957

INVENTORS
SALVATORE SANTAMARIA
ALVIN R. TOPFER
BY
Herbert Epstein
AGENT

United States Patent Office 2,872,645

Patented Feb. 3, 1959

2,872,645

MECHANICAL APPARATUS

Salvatore Santamaria, Philadelphia, and Alvin R. Topfer, Ambler, Pa., assignors to Philco Corporation, Philadelphia, Pa., a corporation of Pennsylvania Application August 23, 1957, Serial No. 679,815

10 Claims. (Cl. 324—158)

Figure 1:
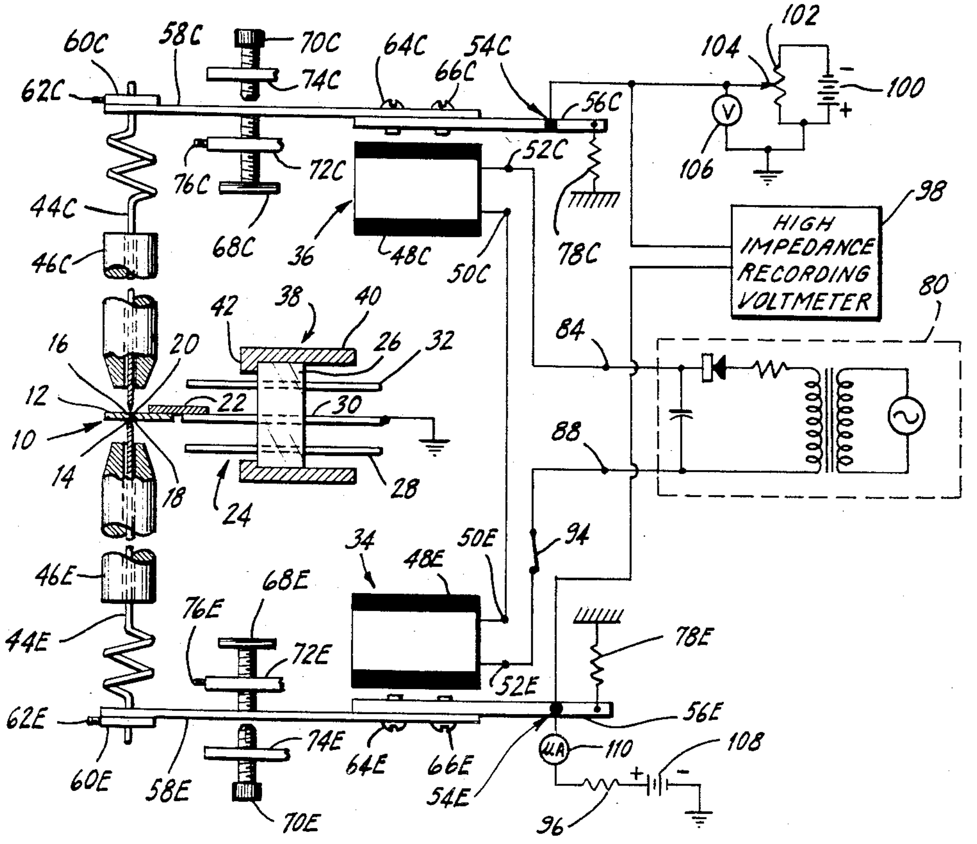

This invention relates to mechanical apparatus and more particularly to improved electromagnetically actuated apparatus for contacting the emitter and collector electrodes of transistors of the type in which these electrodes are positioned on opposing surfaces of a semiconductive body. More specifically this apparatus is especially useful in combination with apparatus for measuring the punchthrough voltage of a transistor.

In this regard, in order that a transistor may amplify efficiently high-frequency alternating currents, it is necessary that the transistor have a small base width, typically of the order of 0.00007 to 0.00014 inch, so that the transit time of injected minority carriers traveling from the emitter element to the collector element of the transistor shall be small. However, a transistor having such a small base width generally has also a small punchthrough voltage. The latter voltage is the smallest value of back-biasing voltage which, when applied between the collector and base (or emitter and base) elements of the transistor, produces within its base element a space-charge region extending between the collector and emitter elements. The condition wherein the aforementioned space-charge region extends entirely across the base element, between the emitter and collector elements, is termed punchthrough.

During the time that the transistor is in a punched-through condition, it does not operate in its normal minority-carrier diffusion mode but instead operates with such greatly altered impedance and amplification characteristics that it becomes unsuited for or inoperative in circuits designed for transistors functioning in their conventional manner. Because, in conventional transistor circuits, the collector element is generally operated with a back-biasing voltage applied thereto, the punchthrough voltage is an important parameter limiting the maximum collector voltage which may be applied to the transistor consistent with the normal transistor mode of operation.

Because punchthrough voltage varies directly as the square of the base width of the transistor, it was thought at first that successive transistors having substantially the same punchthrough voltage could be produced merely by forming base regions of substantially equal width in successive semiconductive bodies having approximately the same density of significant impurities. However, the punchthrough voltage of a transistor is proportional not only to the square of the base width, but also to the respective reciprocals of the bulk resistivity of the semiconductive material and the mobility of minority carriers therewithin, and the values of the latter two quantities may vary substantially even for extremely small differences in the crystalline structure of different lots of the semiconductive material. As a result, even where the base widths of successive transistors are maintained within extremely close tolerances, the value of their punchthrough voltages may nevertheless vary over a substantial range of values due to unavoidable variations in the nature of the crystalline material. Since in many applications it is essential that the punchthrough voltage be substantially equal to a fixed predetermined value, it has heretofore been necessary in production frequently to discard a substantial number of the transistors so fabricated because their punchthrough voltages fell outside the narrow tolerance limits permissible for this parameter. The costliness of such a procedure will be apparent.

To avoid this undesirable loss of time and materials and the high costs resulting therefrom, it has proved desirable in certain instances to control the thicknesses of the bases of successive transistors so a produce units having substantially the desired punchthrough voltage. For example, one method for producing this result in the manufacture of surface-barrier transistors is to record or otherwise detect the values of the punchthrough voltages of successive transistors and to adjust periodically, either automatically or manually, the thickness to which the etching apparatus machines the semiconductive wafers, so as to compensate for systematic deviations of the successive punchthrough voltages from the desired value.

To achieve this end in an assembly line arrangement for mass-producing transistors, it is necessary that punchthrough voltage-measuring apparatus be provided which may be manipulated facilely by a relatively unskilled operator. Moreover, in order that the measurement be accurate, it is also necessary to make low-resistance electrical contacts to the emitter and collector electrodes of the transistors without, however, damaging the transistor. However, where as in the cases of surface-barrier transistors and alloy-junction transistors, the emitter and collector electrodes are mounted on opposing surfaces of an extremely thin wafer of brittle semiconductive material, the transistor is in fact very easily damaged, being readily fractured by any impact or force of appreciable magnitude applied to the electrodes. Thus to avoid fracturing the fragile transistor body, electrical contact to the emitter and collector electrodes must be made in a manner such that only the minimum amount of mechanical impact and force needed to assure a low-resistance connection is applied.

Accordingly it is an object of our invention to provide improved contacting apparatus.

Another object is to provide improved contacting apparatus for making electrical connections to electrodes respectively positioned on opposing surfaces of a body.

A further object is to provide improved contacting apparatus for making low-resistance electrical connections with a minimum of force and impact to electrodes respectively positioned on opposing surfaces of a body.

An additional object is to provide improved contacting apparatus for making low-resistance electrical connections to the emitter and collector electrodes of a transistor, said electrodes being positioned on opposing surfaces of a fragile semiconductive body and said connections being made with a force and impact insufficient to damage the transistor.

A still further object is to provide improved contacting apparatus which may be used successfully by technically unskilled operators working on an assembly line.

Yet another object is to provide improved contacting apparatus which is especially useful, in combination with appropriate electrical means, for measuring the punchthrough voltages of transistors.

An additional object is to provide improved contacting apparatus which is readily adapted to incorporation in a mechanized assembly line for the mass production of transistors.

All of the foregoing objects of our invention are achieved through the provision of novel apparatus for effecting low-resistance electrical connections to first and second electrodes respectively mounted on opposing surfaces of a body. This apparatus comprises means for maintaining this body in a fixed position, as well as first and second conductive probes. In addition it comprises first means for constraining the first probe to be translatable substantially only along a line passing through each of said electrodes, to bring a portion of the first probe into abutting relation with the first electrode, as well as second means for constraining the second probe to be translatable substantially only along said line to bring a portion of the latter probe into abutting relationship with the second electrode. Importantly the apparatus includes means for regulating the extent of the respective translatory motions of the first and second probes to prevent the aforementioned portions of these probes from approaching one another more closely than a distance greater than the length of said line which is intercepted by said body, while nonetheless permitting the probes to approach each other by a distance smaller than the distance between the electrodes at their most widely spaced points along this line. To reduce the impact of the probes with the electrodes when the probes are urged into abutting relationship therewith, first and second resilient means are coupled respectively to the first and second probes. In addition, to actuate the two probes, means are provided which are controllable to urge said portions of the two probes substantially simultaneously into abutting relationship respectively with the first and second electrodes and are also controllable to retract both probes substantially simultaneously from contact with the respective electrodes, thereby assuring that the force and impact exerted on the body by one probe is at all times substantially balanced by an opposing force and impact exerted by the other probe.

Figure 2:
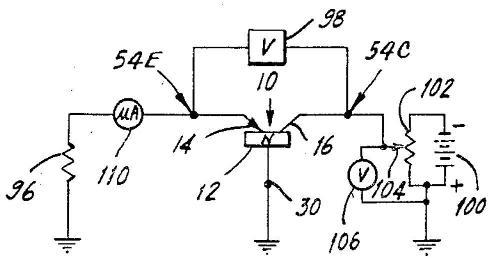
Figure 3:
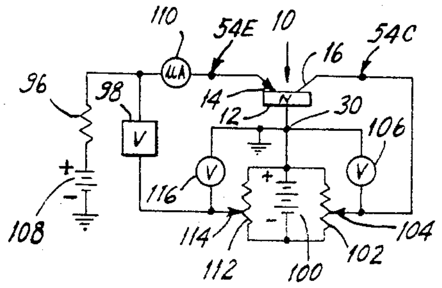

Other advantages and features of the invention will become apparent from a consideration of the following detailed description, taken in connection with the accompanying drawings, in which:

Figure 1 is an illustration, partly diagrammatic and partly in section, of a preferred form of the apparatus according to our invention; and Figures 2 and 3 are diagrammatic representations of two forms of a punchthrough-voltage measuring apparatus.

Turning first to Figure 1 there is shown schematically a punchthrough-voltage measuring apparatus embodying our invention. This embodiment is described specifically with regard to its use in measuring the punchthrough voltages of surface-barrier transistors. However it is to be understood that it can also be used to measure the punchthrough voltages of many other types of transistors.

Thus Figure 1 depicts a partly fabricated surface-barrier transistor 10, the punchthrough voltage of which is to be ascertained. This transistor comprises a wafer 12 of n-type germanium which typically may have a bulk resistivity of approximately 0.8 ohm-centimeter, a minority-carrier lifetime exceeding 50 microseconds, a length and width a 0.10 inch and 0.05 inch respectively, and a thickness over most of its area of about 0.003 inch. Transistor 10 additionally includes emitter and collector electrodes 14 and 16 respectively, which may be composed of indium and are positioned in coaxial depressions 18 and 20 respectively. Typically the thickness of the semiconductive material remaining between the opposing depressions is 0.00012 inch. Transistor 10 further comprises a nickel base tab 22 secured to wafer 12 by means providing a substantially ohmic contact therewith, e. g. by a solder constituted primarily of tin. In addition transistor 10 includes a mounting structure 24 which comprises a cylindrical glass stem 26 in which are embedded three nickel-plated copper stem leads 28, 30 and 32 respectively, positioned in parallel coplanar relationship to the axis of the stem. Wafer 12 is electrically connected to the centrally-positioned stem lead 30 of structure 24 by welding of the base tab 22 to lead 30. The peripheral stem leads 28 and 32 are, at a later stage in the transistor fabrication process, electrically connected respectively to emitter electrode 14 and collector electrode 16 by wire leads (not shown).

To measure the punchthrough voltage of transistor 10 it is necessary to make low-resistance electrical contacts resectively with emitter electrode 14 and collector electrode 16 thereof. Moreover, in order that the punchthrough-voltage measuring apparatus may be useful in an assembly-line for mass-producing transistors at high speed, it is necessary that an unskilled worker be able to both make and break rapidly these low-resistance electrical contacts without damaging the transistor. It will be understood that the transistor is in fact very easily damaged because, as aforementioned, the thickness of semiconductive material between its emitter and collector electrodes is frequently less than one-ten-thousandth of an inch and is readily fractured by an impact or force of appreciable magnitude. Thus, to avoid fracturing the fragile transistor body, electrical contact to the emitter and collector electrodes must be made in a manner such that only the minimum amount of mechanical impact and force needed to assure a low-resistance connection is applied.

A contacting apparatus according to our invention which fulfills all of these stringent requirements is shown in Figure 1 and comprises an emitter-contacting subassembly 34, a collector-contacting subassembly 36, and a transistor-positioning jig 38 all fixedly positioned with respect to each other. The emitter-contacting and collector-contacting subassemblies 34 and 36 respectively, are of substantially identical structure, so that a detailed description of only one of these subassemblies is required.

As shown in the drawing, transistor-positioning jig 38 may comprise a cylindrical metal shell, shown in section at 40, which over the greater part of its length has an inside diameter substantially equal to the outside diameter of the glass stem 26 of transistor 10, and has at one end 42 thereof a smaller inside diameter which is slightly greater than the distance between the peripheral stem leads 28 and 32, respectively. When the punchthrough voltage of a partially assembled transistor such as transistor 10 is to be measured, the partially assembled transistor is inserted within jig 38 in a manner such that the germanium wafer 12 extends through the aperture in end 42, and the surface of glass stem 26 adjacent wafer 12 abuts this end.

The emitter-contacting subassembly 34, which affords a precisely-positioned and low-resistance electrical contact to emitter 14 of transistor 10 with a minimum of impact and force comprises a contacting probe 44E which is sharply pointed at one end, i. e. the end which is to contact emitter 14, and is coiled into a spiral spring at the other end. Typically, probe 44E may be fabricated from stainless steel or tungsten.

To guide the point of probe 44E accurately to emitter electrode 14 of transistor 10 when the latter is positioned within jig 38 as shown, a glass tubing 46E is provided whose bore is only slightly larger than the diameter of probe 44E. Tubing 46E is fixedly positioned with respect to jig 38 in a manner such that the longitudinal axis of its bore is substantially perpendicular to the surfaces of wafer 12 and passes substantially through the center of emitter electrode 14.

To force the point of the probe 44E against emitter electrode 14 after transistor 10 has been positioned properly within jig 38, and subsequently to disconnect probe 44E from emitter 14 after the punchthrough voltage has been measured, a relay-like electromagnetic actuating apparatus is provided. This apparatus comprises a coil 48E having terminals 50E and 52E respectively and fixedly positioned with respect to tubing 46E, and a pair of pivots one of which is shown at 54E, and about which an armature 56E, fabricated of a highly permeable metal such as soft iron, is constrained to swing. It additionally includes a probe holder 58E which may be fabricated from stainless steel and comprises a fitting 60E containing a hole of a diameter just exceeding the diameter of probe 44E and which accommodates a setscrew 62E to secure probe 44E to probe holder 58E. The apparatus further comprises iron screws 64E and 66E respectively which serve to fasten probe holder 58E to armature 56E, and limit screws 68E and 70E respectively which are threaded into brackets 72E and 74E respectively and serve to establish the limits of arcuate travel of armature 56E and probe holder 58E about pivot 54E. Brackets 72E and 74E are positioned fixedly with respect to pivot 54E and coil 48E, and bracket 72E has a set screw 76E threaded thereinto by which limit screw 68E can be immobilized. Lastly, the apparatus comprises a tension spring 78E, one end of which is secured to armature 56E and the other end of which is secured to a point fixed with respect to pivot 54E. Spring 78E serves to urge probe holder 58E against the end of limit screw 70E when coil 48E is unenergized.

As aforementioned, because the base width of transistor 10 is so small, the base region of the transistor is easily damaged by mechanical impacts and forces of any substantial magnitude. Accordingly, to minimize such impacts and forces, setscrew 68E is established at a position such that, when coil 48E is energized, thereby urging armature 56E against setscrew 68E, the point of probe 44E moves just sufficiently to make a low-resistance contact with emitter electrode 14. Moreover, the spring portion of probe 44E serves to absorb a substantial portion of the shock of impact, thereby lessening still further the danger of damaging the transistor. In addition setscrew 70E, which determines the distance by which armature 56E is separated from coil 48E when the latter coil is unenergized, is set at a position such that when coil 48E is unenergized probe 44E is retracted sufficiently far away from emitter 14 so that transistor 10 may be easily inserted into or removed from jig 38 without touching probe 44E, but not so far away that probe 44E can have imparted thereto sufficient momentum or injure transistor 10 when coil 48E is energized.

The collector-contacting subassembly 36 includes a relay-type electromagnetic actuating apparatus which is substantially identical in structure to the just-described actuating apparatus of emitter-contacting subassembly 34. Accordingly, components of the collector-contacting subassembly corresponding to those of the emitter-contacting subassembly are designated by the same numerals, suffixed by the letter "C." Because the functions of the components of collector-contacting assembly 36 are identical to the functions of their counterparts in emitter-contacting subassembly 34, no further discussion thereof is believed necessary herein.

To energize coils 48E and 48C of emitter-contacting and collector-contacting subassemblies 34 and 36 respectively, a D. C. power supply 80 of conventional form is provided having output terminals 84 and 88 respectively. Output terminal 84 is connected directly to terminal 52C of coil 48C, while output terminal 88 is connected to terminal 52E of coil 48E, via a single-pole single-throw control switch 94. To complete the coil-energizing circuit, terminal 50C of coil 48C is directly connected to terminal 50E of coil 48E. By thus connecting coils 48C and 48E in series relationship, the electromagnetic contacting system is conditioned to fail safe in the sense that, if either coil 48C or 48E becomes open-circuited, neither coil can be energized and therefore neither probe 44C nor 44E can be urged singly against the contiguous electrode of transistor 10. Normally however, when switch 94 is closed, coils 48C and 48E are energized simultaneously and armatures 56C and 56E are urged respectively against limit screws 68C and 68E. As a result probes 44C and 44E are urged respectively against collector electrode 16 and emitter electrode 14 of transistor 10. When switch 94 is opened, coils 48C and 48E are simultaneously de-energized, and tension springs 78C and 78E urge probes 44C and 44E, respectively, away from the collector and emitter electrodes 16 and 14 of transistor 10 and against limit screws 70C and 70E respectively. This action, by disengaging probes 44C and 44E from transistor 10, enables free insertion and removal of the transistor from jig 38.

To enable an accurate and direct-reading measurement of the punchthrough voltage of transistor 10 to be made, there is also provided apparatus which applies between collector electrode 16 and body 12 of transistor 10 a back-biasing voltage the magnitude of which substantially exceeds the punchthrough voltage of transistor 10. In addition apparatus is provided which applies between emitter electrode 14 and body 10, via a resistor 96 of substantial value, a small forward-biasing potential. Importantly, to display the value of the punchthrough voltage, which under these biasing conditions appears between emitter electrode 14 and collector electrode 16, a voltmeter 98 is connected between collector 16 and emitter 14. Preferably voltmeter 98 has an impedance substantially higher, e. g. ten or more times higher, than the value of resistor 96, as well as the resistance under punchthrough conditions of semiconductive body 12 between emitter electrode 14 and collector electrode 16, to that the current flowing between the emitter and collector electrodes is not appreciably diverted by voltmeter 98. This punchthrough-voltage measuring apparatus is described and claimed in the copending patent application of R. D. Kehler and A. R. Topfer, Serial No. 679,336 filed August 21, 1957, entitled "Electrical Apparatus," and assigned to the assignee of the present application.

More particularly, and in the specific arrangement shown in Figure 1, the aforementioned back-biasing voltage exceeding the punchthrough voltage of transistor 10 is applied between collector electrode 16 and wafer 12 (which as shown is connected to a point at reference potential via stem lead 30) by a source which comprises a battery 100 shunted by a potentiometer 102 having a movable contact 104. Battery 100 has its positive pole connected to a point at the same reference potential as semi-conductive wafer 12, while potentiometer 102 has its variable contact 104 connected to probe 44C of collector-contacting subassembly 36, via pivot 54C, armature 56C, and probe holder 58C. To display the magnitude of the back-biasing voltage applied between collector electrode 16 and wafer 12 of transistor 10, a voltmeter 106 is connected between movable contact 104 and a point at reference potential.

To supply a forward-biasing current to emitter electrode 12 of transistor 10, a second battery 108 is provided, the negative pole of which is connected directly to a point at reference potential and the positive pole of which is connected to probe 44E via resistor 96, a microammeter 110, pivot 54E, armature 56E, and proble holder 58E. Preferably resistor 96 has a relatively high value, e. g. of the order of 1 to 5 megohms.

Importantly, to obtain a permanent record of the value of the punchthrough voltage of transistor 10 as well as that of succeeding transistors to be tested, voltmeter 98 is preferably a recording voltmeter and is connected directly between pivots 54C and 54E, thereby affording direct connection to the collector and emitter electrodes 16 and 14 respectively of transistor 10 via armatures 56C and 56E, probe holders 58C and 58E and contacting probes 44C and 44E respectively.

In a typical instance, wherein body 12 of transistor 10 is constituted of monocrystalline n-type germanium having a bulk resistivity of the order of 0.8 ohm-centimeter and a base width of the order of 0.00012 inch, transistor 10 has a punchthrough voltage of about 10 volts. For measuring the punchthrough voltage of such a transistor, the components and applied voltages and currents may have the following values:

| | |
|---|---|
| Battery 100 | 22.5 volts. |
| Potentiometer 102 | 25,000 ohm. |
| Voltmeter 106 | 0 to 25 volt scale. |
| Battery 108 | 1.5 volts. |
| Resistor 96 | 2.2 megohms. |
| Microammeter 110 | 0–3 microampere scale. |
| Voltmeter 98 | 0–25 volt scale, 60 megohms input resistance. |
| Collector-to-base voltage | 20 volts. |
| Emitter current | About 1 microampere. |

It is of course to be understood that these values are merely exemplary and are in no way intended to limit the scope of our invention.

Under these conditions, whenever probes 44E and 44C contact emitter and collector electrodes 14 and 16 respectively, the high-impedance recording voltmeter 98 indicates and records with high accuracy the punchthrough voltage of transistor 10 under test, without resort to the oscilloscopes and sweep generators required by the prior art. As a result, the apparatus of Figure 1 lends itself to use in a simple, straightforward method which may readily be practiced by an unskilled operator on an assembly line to measure the punchthrough voltages of a succession of transistors.

In this regard, a typical assembly-line operation of the arrangement of Figure 1 is as follows. Initially, switch 94 is opened, thereby de-energizing coils 48C and 48E and causing probes 44C and 44E to be retracted within glass tubing 46C and 48E by the operation of springs 78C and 78E. Next, partially-completed transistor 12 is inserted within jig 38, and electrical connection is made between stem lead 30 and a point at reference potential. Then control switch 94 is closed, thereby energizing coils 48C and 48E. This action causes probes 44E and 44C to be urged gently into low-resistance electrical contact with emitter and collector electrodes 14 and 16 respectively. As a result the operating voltages respectively supplied to these probes are applied to the contacted electrodes. Consequently the punchthrough voltage of the transistor is accurately displayed and recorded by high-impedance recording voltmeter 98. Thereafter switch 94 is again opened; transistor 10 is removed from jig 38; a new transistor is inserted therein, and the operation is repeated. By observing the magnitudes and their trend of the successively measured punchthrough voltages, as recorded by high-impedance voltmeter 98, the operator can determine rapidly whether each of the transistors being manufactured has a punchthrough voltage within the permitted range and whether the punchthrough voltages of successive units are undesirably trending toward a value outside of the permitted range. If such a trend in fact exists, the operator can then readily compensate for it by varying in the appropriate sense the thickness to which the semiconductive bodies of subsequent transistors are etched.

By utilizing such a technique, it has been found possible to obtain, for example, a 90 percent yield of transistors having punchthrough voltages within 1.5 volts of the desired value of 8.5 volts, whereas when the same type of transistor was fabricated without this punchthrough-measuring step but with the same tolerance requirement, the yield was only 60 percent. From these contrasting yields, the great commercial usefulness of our novel apparatus is readily apparent.

The punchthrough voltage-measuring apparatus of Figure 1 is only one of a variety of circuits usable with the contacting apparatus of our invention. For example, two additional arrangements usable with our novel apparatus are shown in Figures 2 and 3 of the drawings. In the latter figures, emitter and collector contacting subassemblies 34 and 36 respectively, power supply 80 for coils 48C and 48E and transistor positioning jig 38, all depicted in Figure 1, have been omitted for simplicity, and only the schematic diagrams of the punchthrough-voltage measuring circuits are shown. However these contacting subassemblies are preferably also used in combination with the measuring circuitry of each of Figures 2 and 3 to provide the necessary connections to the elements of the transistor to be tested. Accordingly the appropriate reference characters of Figure 1 have been used to designate the points at which the components of the circuits of Figures 2 and 3 are respectively connected to emitter-contacting probe 44E, collector-contacting probe 44C and stem lead 30 of Figure 1.

Turning now specifically to the arrangement of Figure 2, it is seen that the latter arrangement differs from that of Figure 1 in only two respects, namely, battery 108, connected in the emitted circuit of Figure 1, has been removed, and the terminal of resistor 96, connected in Figure 1 to the positive pole of battery 108, is connected in the arrangement of Figure 2 directly to a point at reference potential. In this regard, we have found that, as in the case of the embodiment of Figure 1, so long as resistor 96 has a value substantially smaller than the input resistance of recording voltmeter 98, preferably one-tenth or less than this input resistance, voltmeter 98 indicates directly and accurately the punchthrough voltage of transistor 10.

Figure 3 illustrates a voltage-measuring circuit which is particularly useful where the quantity to be measured is functionally related, though not necessarily equal, to the punchthrough voltage of the transistor. Such a quantity may be, for example, the deviation of the punchthrough voltage of the transistor from a predetermined voltage. In the arrangement shown in Figure 3, the structure for supplying a reverse-biasing voltage exceeding the punchthrough voltage to the collector electrode 16, and the structure for supplying a forward-biasing current to emitter electrode 14 are respectively identical to the corresponding structures of Figure 1. However the apparatus of Figure 3 additionally comprises a second potentiometer 112 which has a movable contact 114 and is shunted across battery 100. Movable contact 114 is connected in series relationship with recording voltmeter 98, whose other terminal is connected to the junction of microammeter 110 and resistor 96, as in the preceding embodiments. To measure the value of the voltage applied to recording voltmeter 98 by potentiometer 112, a voltmeter 116 is connected between movable arm 114 and semiconductive body 12.

In operation, the position of movable contact 114 may be adjusted, with the aid of voltmeter 116, so that its potential equals the potential of collector electrode 16. Under these conditions, the potentials applied to voltmeter 98 are the same as those applied in the arrangement of Figure 1, and the actual punchthrough voltage is again indicated by voltmeter 98. However by changing the position of movable contact 114 from the above-mentioned position, the potential applied to voltmeter 98 can be changed by a known amount from the potential of collector electrode 16. Such a change causes recording voltmeter 98 to indicate a voltage differing from the punchthrough voltage by this known amount. Accordingly where it is desired to measure the deviation of the punchthrough of the transistor being tested from a predetermined optimum value, it is only necessary to adjust movable contact 114 of potentiometer 112 so that its potential is less than the collector potential by an amount equal to said predetermined value.

While each of the three circuits described above is specifically adapted to measure the punchthrough voltages of transistors having n-type semiconductive bodies, the apparatus is by no means limited to measuring the punchthrough voltages of only these types of transistors. On the contrary the apparatus may be instantly adapted for measuring the punchthrough voltage of transistors having p-type semiconductive bodies merely by reversing the polarity of each battery and meter appearing in the apparatus. Moreover while in the specific example, the transistor was described as having a germanium body, this body can obviously be fabricated of silicon or any other suitable semi-conductive material.

Furthermore, while the transistor whose punchthrough voltage is to be measured is specifically described in the foregoing discussion as being a surface-barrier transistor, it is to be understood that our apparatus is also capable of measuring the punchthrough voltages of other forms of transistors, e. g. alloy-junction and grown-junction transistors, which comprise, as emitter and collector elements, first and second rectifying junctions positioned on opposing surfaces of a semi-conducting body.

Moreover, while voltmeter 98 has been illustrated in each example as a recording voltmeter, it obviously need not be a recording voltmeter but instead may be a pointer-indicating voltmeter or a voltmeter using any other form of indication which is convenient in the specific applications for which our apparatus is to be used. In addition, while in the preferred embodiments the reverse-biasing voltage applied between the collector electrode and semiconductive body has a substantially constant value, it is not essential that this voltage be constant. For example, the reverse-biasing voltage may take the form of unidirectional pulses having a maximum amplitude substantially exceeding the punchthrough voltage of the transistor. Such a pulsating voltage may be supplied by simple apparatus (not shown) which, for example, may comprise a source of alternating voltage having an amplitude exceeding the punchthrough voltage of the transistor to be tested, and a rectifier and a resistor connected in series relationship with each other and in shunt with this source. A suitable unidirectional voltage is then produced across the resistor. Where such a pulsating voltage is used as the collector-to-base or emitter-to-base voltage, the recording voltmeter preferably is a peak-reading instrument.

In addition, while in each of the above-described embodiments the back-biasing voltage exceeding the punchthrough voltage is applied between the collector electrode and the semiconductive body, this back-biasing voltage may alternatively be applied between the emitter electrode and the body. In such a case, the collector electrode of the transistor is either supplied with a small forward-biasing current by way of resistive means or is connected by these means directly to the base electrode of the transistor. In such an arrangement, the recording voltmeter may be connected directly between the emitter and collector electrodes, as shown in Figures 1 and 2, or may be connected in series relationship with the collector electrode and a source of voltage having a magnitude related in known manner to that applied to the emitter electrode, in the manner of Figure 3.

Furthermore, while in the illustrated preferred embodiment of the mechanical contacting apparatus according to our invention, the electromechanical apparatus controllable to urge the probes into substantially simultaneous contact with the emitter and collector electrodes of the transistor and controllable to retract these probes substantially simultaneously therefrom comprise two separate coils connected in series relationship, this apparatus may comprise alternatively a single solenoid (not shown) having one probe-controlling armature arranged adjacent one end thereof and the other probe-controlling armature arranged adjacent the other end thereof. Under these conditions, both armatures are simultaneously urged toward said solenoid upon its energization, thereby causing both probes to be urged substantially simultaneously into contact with the rectifying electrodes of the transistor. Moreover, upon the de-energization of the solenoid both armatures are urged substantially simultaneously away from the respective ends of the solenoid, thereby retracting said probes substantially simultaneously from said rectifying electrodes.

Moreover, where it is necessary to achieve simultaneous closure with even less impact than in the apparatus described in detail above, the electromagnetic actuating apparatus may employ slow pull-in coils, as well as dashpots (not shown) coupled to each armature.

In addition, it is not essential that electromagnetic actuating means be used to perform the simultaneous contacting and simultaneous retracting operation. Alternatively the coils may be replaced by appropriate mechanical linkages (not shown) intercoupling the armatures. As still another alternative, the coils may be replaced by pneumatic or hydraulic actuators of well-known form.

While we have described our invention by means of specific examples and in a specific embodiment, we do not wish to be limited thereto, for obvious modifications will occur to those skilled in the art without departing from the scope of our invention.

What we claim is:

1. Apparatus for effecting low-resistance electrical connections to first and second electrodes respectively mounted on opposing surfaces of a body, said apparatus comprising: means for maintaining said body in a fixed position; first and second conductive probes; first means for constraining said first probe to be translatable substantially only along a line passing through each of said electrodes, to bring a portion of said first probe into abutting relationship with said first electrode; second means for constraining said second probe to be translatable substantially only along said line, to bring a portion of said second probe into abutting relationship with said second electrode; means for regulating the extent of said respective translatory motions of said first and second probes so as to prevent said portions of said probes from approaching each other more closely than a distance greater than the length of the segment of said line intercepted by said body, but also so as to permit said probes to approach each other by a distance smaller than the distance between said electrodes at their most widely spaced points along said line; first and second resilient means, respectively coupled to said first and second probes, for reducing the impact of said probes when said probes are urged into abutting relationship with said electrodes; and means controllable to urge said portions of said first and second probes substantially simultaneously into abutting relationship respectively with said first and second electrodes and also controllable to retract said first and second probes substantially simultaneously from contact with said first and second electrodes respectively.

2. Apparatus according to claim 1, wherein said means controllable to urge and also controllable to retract said probes comprise electromagnetic means.

3. Apparatus according to claim 1, wherein each of said probes comprises a metal filament and said portion of said each probe comprises the end of said filament adjacent said body.

4. Apparatus according to claim 3, wherein said first and second constraining means each comprise means for constraining said translatory motion respectively of said first and second probes to a line passing through said first and second electrodes substantially perpendicularly to a surface of said body.

5. Apparatus according to claim 3, wherein each of said resilient means comprises a spring secured to one of said probes.

6. Apparatus according to claim 5, wherein each of said springs comprises a spiral spring formed integrally with said probe at the end thereof distant from said body.

7. Apparatus according to claim 6, wherein said first and second constraining means each comprise means for constraining said translatory motions respectively of said first and second probes to a line passing through said first and second electrodes substantially perpendicularly to a surface of said body.

8. Apparatus according to claim 7, wherein said means controllable to urge and also controllable to retract said probes comprise electromagnetic means.

9. Apparatus for effecting low-resistance electrical connection, with a minimum of force and impact, to first and second rectifying electrodes of a transistor, said electrodes having a diameter exceeding a given value and being positioned on opposing surfaces of a fragile region of a semiconductive body, said apparatus comprising: means for maintaining said body in a fixed position; first and second conductive probes each comprising a small-diameter, substantially linear metal wire pointed at one end thereof to a diameter not exceeding said given value and having a spiral spring formed integrally therewith at the other end of said wire; first and second tubular guide members for said first and second probes, each of said guide members having a portion whose inside diameter just exceeds said diameter of said wire, the longitudinal axis of each of said guide members being substantially collinear with a line passing through each of said rectifying electrodes substantially perpendicularly to a surface of said body, said first guide member being fixedly positioned in a manner such that an end thereof is adjacent but spaced from said first rectifying electrode, said second guide member being fixedly positioned in a manner such that an end thereof is adjacent but spaced from said second rectifying electrode, said first probe being slidably positioned within said first guide member in a manner such that said pointed end of said first probe is adjacent said first rectifying electrode, and said second probe being slidably positioned within said second guide member in a manner such that said pointed end of said second probe is adjacent said second rectifying electrode; first electromagnetic actuating means comprising a first coil fixedly positioned with respect to said first guide member, a first armature, a first pair of pivots fixedly positioned with respect to said first coil and limiting the motion of said armature to an arcuate path, means mechanically coupling said first armature to that end of said spring of said first probe distant from said pointed end thereof, a first spring urging said armature in a sense so as to tend to move said first probe away from said first rectifying electrode, and first means for regulating the extent of arcuate travel of said first armature in a manner such that said first probe is prevented from touching said body but is permitted to abut said first rectifying electrode; second electromagnetic actuating means comprising a second coil fixedly positioned with respect to said second guide member, a second armature, a second pair of pivots fixedly positoned with respect to said coil and limiting the motion of said second armature to an arcuate path, means mechanically coupling said second aramture to that end of said spring of said first probe distant from said pointed end thereof, a second spring urging said second armature in a sense so as to tend to move said second probe away from said second rectifying electrode, and second means for regulating the extent of arcuate travel of said second armature in a manner such that said second probe is prevented from touching said body but is permitted to abut said second rectifying electrode; a source of an electric current; switching means; and means connecting said source, said switching means and said first and second coils in series-relationship.

10. Apparatus according to claim 9, said apparatus comprising in addition first and second means for regulating the respective arcuate travels of said first and second armatures away from said first and second coils respectively, in a manner such that said armatures can move sufficiently to retract said probes respectively from said first and second rectifying electrodes, but cannot move so far that the impact on said rectifying electrodes produced by energizing said coils injures said transistor.

No references cited.